United States Patent
Hattori et al.

(10) Patent No.: US 7,273,357 B2
(45) Date of Patent: Sep. 25, 2007

(54) CONTROL DEVICE FOR ELECTRIC COMPRESSOR

(75) Inventors: Makoto Hattori, Aichi-ken (JP); Masahiko Asai, Aichi-ken (JP); Takayuki Takashige, Aichi-ken (JP); Koji Nakano, Aichi-ken (JP); Takashi Nakagami, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/355,248

(22) Filed: Feb. 16, 2006

(65) Prior Publication Data
US 2007/0035272 A1 Feb. 15, 2007

(30) Foreign Application Priority Data
Aug. 10, 2005 (JP) ............................. 2005-232066
Aug. 23, 2005 (JP) ............................. 2005-241156
Aug. 23, 2005 (JP) ............................. 2005-241157

(51) Int. Cl.
*F04B 23/00* (2006.01)
(52) U.S. Cl. ................. 417/313; 417/423.14; 417/417; 417/572; 310/51; 310/52; 310/53
(58) Field of Classification Search .................. 310/52, 310/51, 53; 417/313, 423.14
See application file for complete search history.

(56) References Cited

U.S. PATENT DOCUMENTS 6,041,609 A * 3/2000 Hornsleth et al. ......... 62/259.2
6,107,716 A * 8/2000 Penketh ........................ 310/89
6,135,726 A * 10/2000 Robertson et al. .......... 417/360
6,198,183 B1 * 3/2001 Baeumel et al. ............. 310/52
2003/0143090 A1* 7/2003 Iritani et al. ............. 417/410.5
2004/0009078 A1* 1/2004 Kimura et al. ........... 417/410.5
2005/0063836 A1* 3/2005 Kimura et al. .............. 417/313

FOREIGN PATENT DOCUMENTS

JP 2003-28073 1/2003
JP 2004-190525 7/2004

\* cited by examiner

*Primary Examiner*—Rita Leykin
(74) *Attorney, Agent, or Firm*—Westerman, Hattori, Daniels & Adrian, LLP.

(57) ABSTRACT

A control device includes a shot-pulse control unit that provides, at a time of starting a synchronous motor, a predetermined current to each phase of a stator of the motor for a short time; a detecting unit that detects a current flowing through each phase when the predetermined current is provided; an estimating unit that estimates a position of the rotor by comparing detected values; a voltage control unit that controls application of a voltage to the synchronous motor based on a high-pressure side pressure of the compressor when the compressor is failed to be started due to any cause; and a magnetism-resistant section having a conductive layer sandwiched by insulating layers. The magnetism-resistant section covers a portion of a substrate of the control device, and a portion at which the conductive layer is exposed is in contact with the housing or a part conducting heat to the housing.

5 Claims, 16 Drawing Sheets

FIG.3

| OUTPUT PATTERN | A | B | C | D | E | F | G | H | I | J |
|---|---|---|---|---|---|---|---|---|---|---|
| U | ON | OFF | OFF | OFF | OFF | OFF | PS PHASE IS ON OTHER PHASES ARE OFF | OFF | OFF | OFF |
| V | OFF | OFF | ON | OFF | OFF | OFF | PS PHASE IS ON OTHER PHASES ARE OFF | OFF | OFF | OFF |
| W | OFF | OFF | OFF | OFF | ON | OFF | PS PHASE IS ON OTHER PHASES ARE OFF | OFF | OFF | OFF |
| U- | OFF | OFF | ON | ON | ON | ON | PS PHASE IS OFF OTHER PHASES ARE ON | PS PHASE IS OFF OTHER PHASES ARE ON | PS PHASE IS ON OTHER PHASES ARE OFF | OFF |
| V- | ON | ON | OFF | OFF | ON | ON | PS PHASE IS OFF OTHER PHASES ARE ON | PS PHASE IS OFF OTHER PHASES ARE ON | PS PHASE IS ON OTHER PHASES ARE OFF | OFF |
| W- | ON | ON | ON | ON | OFF | OFF | PS PHASE IS OFF OTHER PHASES ARE ON | PS PHASE IS OFF OTHER PHASES ARE ON | PS PHASE IS ON OTHER PHASES ARE OFF | OFF |

FIG.9

| | ESTIMATED POSITION | |
|---|---|---|
| | I+>I- | I+<I- |
| Iu>Iv=Iw | 0° | 180° |
| Iu>Iw>Iv | 15°±15 | 195°±15 |
| Iu=Iw>Iv | 30°*1 | 210°*1 |
| Iw>Iu>Iv | 225°±15 | 45°±15 |
| Iw>Iu=Iv | 240° | 60° |
| Iw>Iv>Iu | 255°±15 | 75°±15 |
| Iv=Iw>Iu | 90°*2 | 270°*2 |
| Iv>Iw>Iu | 105°±15 | 285°±15 |
| Iv>Iu=Iw | 120° | 300° |
| Iv>Iu>Iw | 135°±15 | 315°±15 |
| Iu=Iv>Iw | 330°*3 | 150°*3 |
| Iu>Iv>Iw | 345°±15 | 165°±15 |

*1 $\begin{cases} Iu+>Iu- \Rightarrow 30° \\ Iw+>Iw- \Rightarrow 210° \end{cases}$

*2 $\begin{cases} Iv+>Iv- \Rightarrow 90° \\ Iw+>Iw- \Rightarrow 270° \end{cases}$

*3 $\begin{cases} Iu+>Iu- \Rightarrow 330° \\ Iv+>Iv- \Rightarrow 150° \end{cases}$

FIG.12

| SD SIGNAL | OVERCURRENT DETECTION BY SOFTWARE | JUDGMENT |
|---|---|---|
| NORMAL | NORMAL | NORMAL |
| NORMAL | OVERCURRENT DETECTION | TORQUE IS LARGE |
| OVERCURRENT DETECTION (HARDWARE) | NORMAL | INVERTER ABNORMALITY |
| OVERCURRENT DETECTION (HARDWARE) | OVERCURRENT DETECTION | INVERTER ABNORMALITY |

CONTROL DEVICE FOR ELECTRIC COMPRESSOR

CROSS-REFERENCE TO RELATED APPLICATIONS

This application is based upon and claims the benefit of priority from Japanese Patent Application No. 2005-232066, filed Aug. 10, 2005; Japanese Patent Application No. 2005-241157, filed Aug. 23, 2005, and Japanese Patent Application No. 2005-241156, filed Aug. 23, 2005, the entire contents of which are incorporated herein by reference.

BACKGROUND OF THE INVENTION

1. Field of the Invention

The present invention relates to a control device for an electric compressor in a vehicle-mounted air conditioner.

2. Description of the Related Art

In an electric vehicle-mounted air conditioner mounted on a hybrid vehicle, a fuel cell electric vehicle (FCEV), and a hydrogen vehicle, so-called sensorless control is generally used as control for an electric compressor. In the sensorless control for the permanent-magnet synchronous motor, synchronized operation cannot be performed immediately because a rotor position is unknown at the time of starting of the motor. With such reason, a three-phase voltage (current) for rotating the rotor in one direction at a constant speed is provided for a certain time to the motor to forcibly start the motor (for example, Japanese Patent Application Laid-Open No. 2003-28073). A control device for performing the sensorless control is required to be separately provided for the electric compressor.

The control device may be integrated with a housing of the electric compressor to save a mounting space. When an engine or a large motor for driving a vehicle is provided near the control device, even when the control device is integrated with the housing, it is necessary to protect the control device from heat generated by the engine or the large motor. It is also necessary to protect an internal circuit of the control device from electromagnetic waves coming from the outside and electromagnetic waves from a power electronics component and a switching circuit of the control device itself. To protect the internal circuit, for example, devices or substrates are disposed via a metallic plate or an aluminum block that is also used for fixing the devices or the substrates to a cooling device (for example, Japanese Patent Application Laid-Open No. 2004-190525).

However, such housing of the electric compressor integrated with the control device does not have a sufficient size for a size of a control substrate. In addition, there is a strong demand for a further reduction in size of the electric compressor because the electric compressor is mounted on a vehicle. Therefore, a circuit board constituting the control device is divided into two pieces to be stacked to reduce an area for housing the circuit board. However, a switching device for handling a large current is indispensable for the smooth control of the motor. As the size of the control device decreases, circuit malfunction due to noise mainly caused by the switching device in the housing occurs, and an influence of heat generated from the device on other devices causes problems.

Moreover, in a control performed by such control device, the compressor connected to the rotor does not operate stably and causes a noise. In the electric compressor as a product, noise should be eliminated as much as possible. In particular, the hybrid vehicle, the FCEV, and the hydrogen vehicle are extremely quiet because wheels of the vehicles are driven by a motor without using an engine. Therefore, the noise is likely to degrade values of the vehicles as products. If the electric compressor is controlled without grasping a position of the rotor, the likelihood of failure in starting the motor increases. In the hybrid vehicle, the FCEV, and the hydrogen vehicle, a power source is common for wheel driving and the electric compressor. Therefore, power consumption due to the failure in starting the motor should be avoided as much as possible.

It is an object of the present invention to at least solve the problems in the conventional technology.

A control device according to one aspect of the present invention is used in an electric compressor and includes a shot-pulse control unit configured to provide, at a time of starting a permanent-magnet synchronous motor, a predetermined current to each of phases of a stator of the permanent-magnet synchronous motor for such a short time that a rotor does not rotate; a detecting unit configured to detect a value indicative of a current flowing through each of the phases when the predetermined current is provided to each of the phases; and a estimating unit configured to estimate a position of the rotor by comparing values detected by the detecting unit.

A control device according to another aspect of the present invention is used in an electric compressor and includes a voltage control unit configured to control application of a voltage to a permanent-magnet synchronous motor included in or connected to the electric compressor by applying and stop applying the voltage when the electric compressor is stopped during starting of the electric compressor due to any cause. The voltage control unit is configured to control the application based on a high-pressure side pressure of the electric compressor.

A control device according to still another aspect of the present invention is used in an electric compressor in which a control device that controls a motor provided in the electric compressor is mounted integrally with a housing of the electric compressor. The control device includes a magnetism-resistant section formed in a sheet shape by sandwiching a conductive layer having an electric conductivity and a thermal conductivity, with insulating layers, and configured to cover a portion of a substrate of the control device. The magnetism-resistant section includes a portion at which the conductive layer is exposed, and is arranged such that the portion is in contact with any one of the housing and a part conducting heat to the housing.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a table of an ON/OFF state of respective gates of an inverter;

FIG. 9 is a table of a relation among electric currents flowing to respective phases of a motor stator and estimated positions of a rotor;

FIG. 12 is a table of inverter failure judgment patterns;

DETAILED DESCRIPTION OF THE PREFERRED EMBODIMENTS

Exemplary embodiments according to the present invention are explained in detail below with reference to the accompanying drawings.

A control device for an electric compressor according to the present invention is suitable for manufacturing and use of a control device of a permanent-magnet synchronous motor built in or connected to an electric compressor used in a vehicle-mounted air conditioner.

Figure 1:
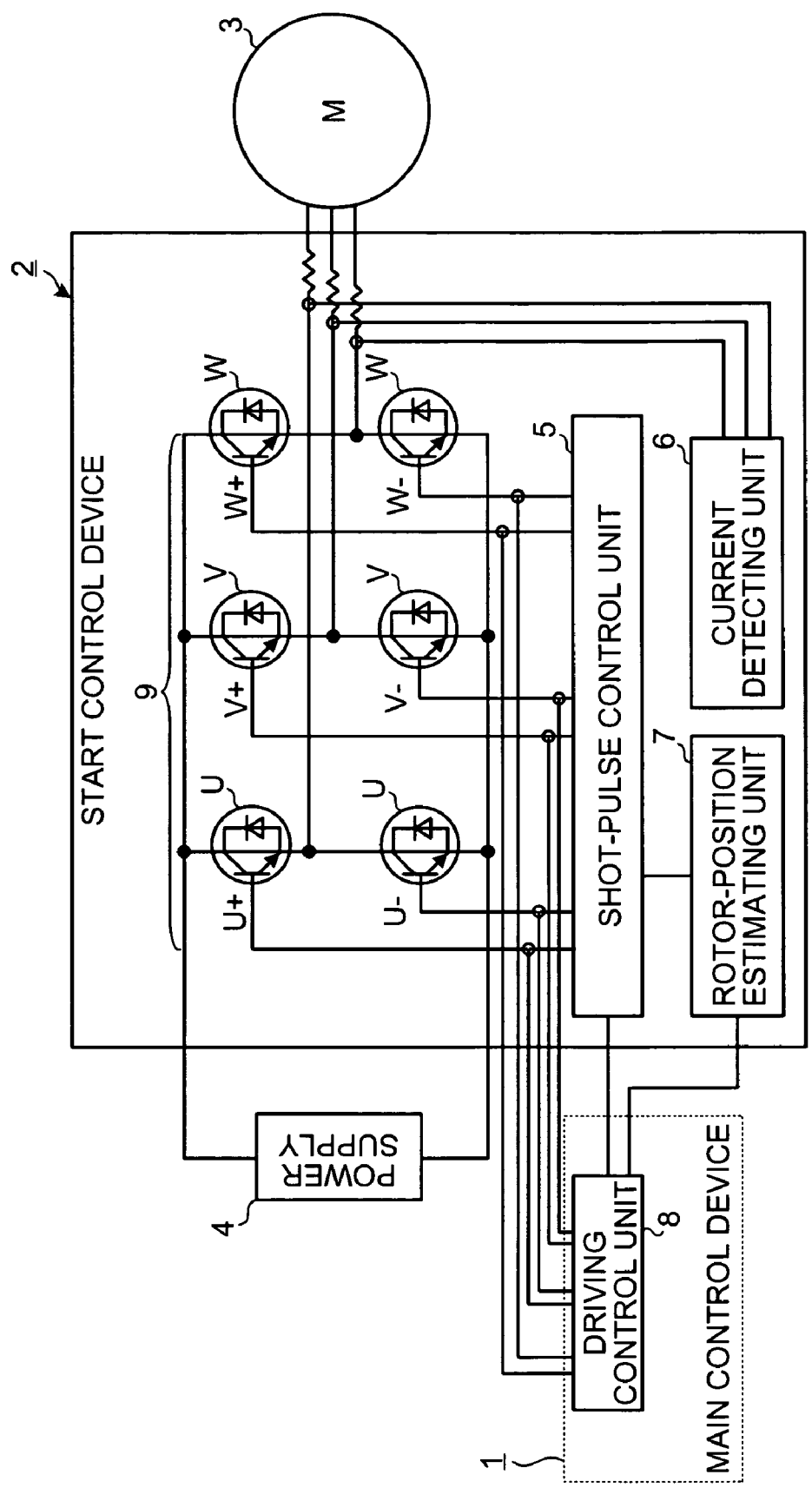
FIG. 1 is a schematic diagram of a configuration according to an embodiment of the present invention.

FIG. 1 is a schematic diagram of a configuration according to an embodiment of the present invention. Usually, in an electric compressor used in a vehicle-mounted air conditioner, a permanent-magnet synchronous motor (hereinafter, "motor") 3 provided in or connected to the vehicle-mounted air conditioner is subjected to inverter control using a stationary direct current (DC) battery as a power supply 4. In the embodiment, the motor 3 is subjected to the inverter control in a similar manner.

Control for the motor 3 at a steady operation is performed in a driving control unit 8 of a main control device 1 of the air conditioner with a number of revolutions or torque of the compressor (the motor 3) required for driving of the air conditioner as a command. Specifically, in response to the command, a three-phase voltage (current) applied to a stator of the motor 3 is subjected to arithmetic processing using speed or a rotation position command value or a feedback current from the stator of the motor 3. A necessary voltage is applied to the motor 3 via a pulse width modulation (PWM) circuit and an inverter 9 to control the motor 3.

In the embodiment, in addition to a general constitution of a steady control device, the electric compressor includes a start control device 2. The start control device 2 includes a shot-pulse control unit 5, a current detecting unit 6, and a rotor-position estimating unit 7. The shot-pulse control unit 5 sends, when the motor 3 is started from a stopped state, a pulse signal of a minimum time width to the inverter 9 to feed an electric current to respective phases U, V, and W of the stator of the motor 3 in order according to a command from the driving control unit 8 of the main control device 1. Consequently, an electric current flows to the respective phases of the motor 3 in order for the minimum time.

The minimum time refers to time during which, even if an electric current is fed to respective phases of a stator of a motor in the minimum time width, a rotor is not rotated by the electric current. Depending on a moment of inertia of the rotor and a magnitude of a stator current, the minimum time is, for example, time equal to or shorter than $\frac{1}{100}$ second. For convenience of explanation, the inverter 9 is shown as being provided in the start control device 2. However, the inverter 9 only has to be commonly used as an inverter used for steady driving.

The current detecting unit 6 acquires a value of the electric current, which is fed to the respective phases according to the pulse signal of the shot-pulse control unit 5, using a shunt resistor (not shown) provided in the stator. The rotor-position estimating unit 7 compares values of electric currents acquired and stored in the current detecting unit 6 and estimates a rotor position. After the rotor position is estimated, the rotor-position estimating unit 7 communicates the position information to the driving control unit 8 of the main control device 1 and performs a synchronous driving control for the conventional synchronous motor corresponding to the position.

Figure 2:
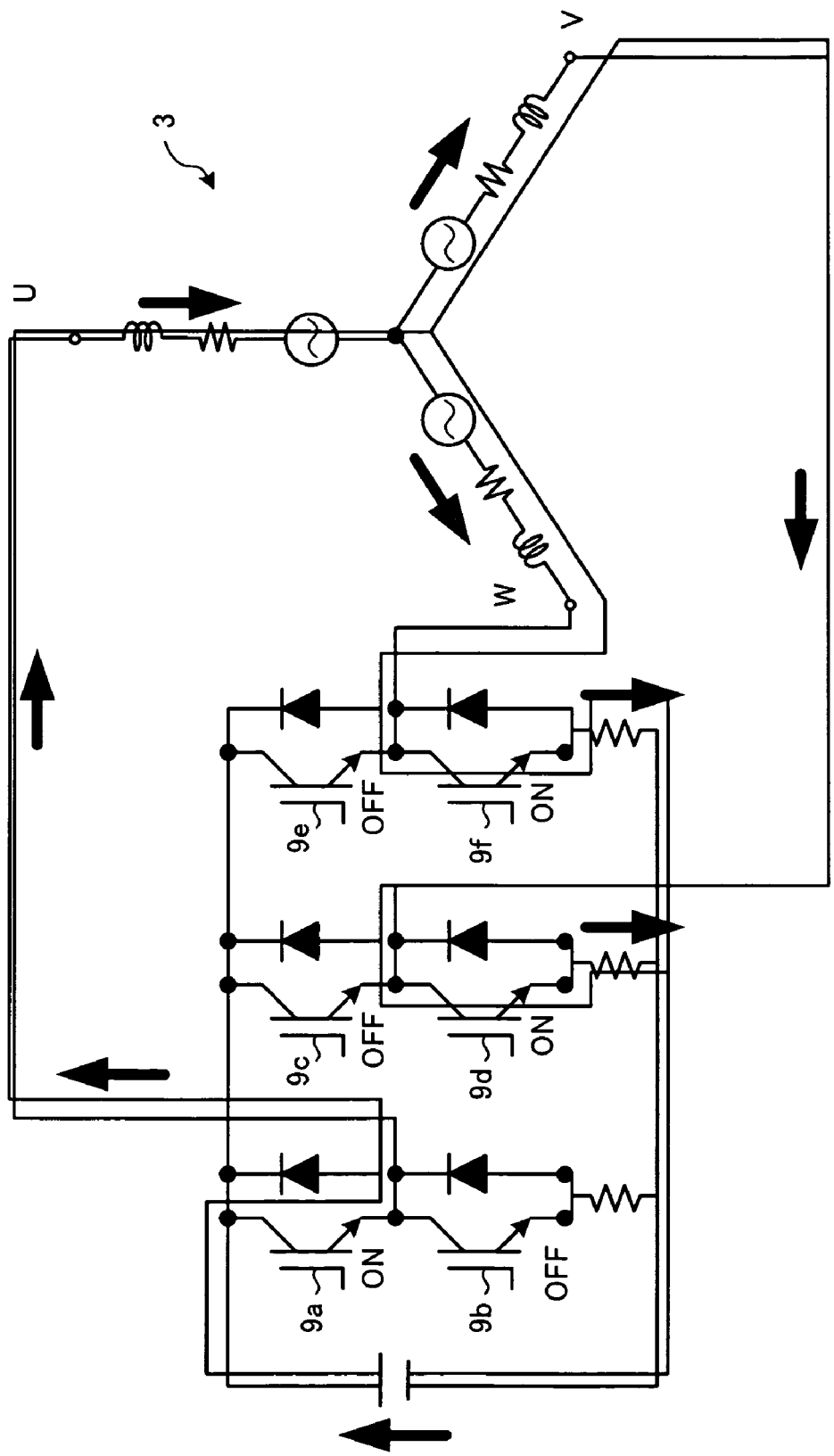
FIG. 2 is a circuit diagram of an inverter circuit and a motor equivalent circuit.

FIG. 2 is a circuit diagram of an inverter circuit and an electric equivalent circuit. The shot-pulse control unit sends, when the motor 3 is started from a stopped state, a pulse signal of a minimum time width to the respective phases U, V, and W of the-stator of the motor 3. FIG. 2 illustrates an example when a pulse signal is sent to the U phase. The pulse signal of the shot-pulse control unit can bring three transistors 9a, 9d, and 9f of transistors 9a to 9f of the inverter 9 into an ON state for a minimum time. Consequently, a voltage is applied to the U phase of the motor 3 and an electric current flows for the minimum time. A current value at this point is acquired by a current detecting unit based on voltage drop at a shunt resistor (not shown) provided in series to a stator circuit.

Figure 4:
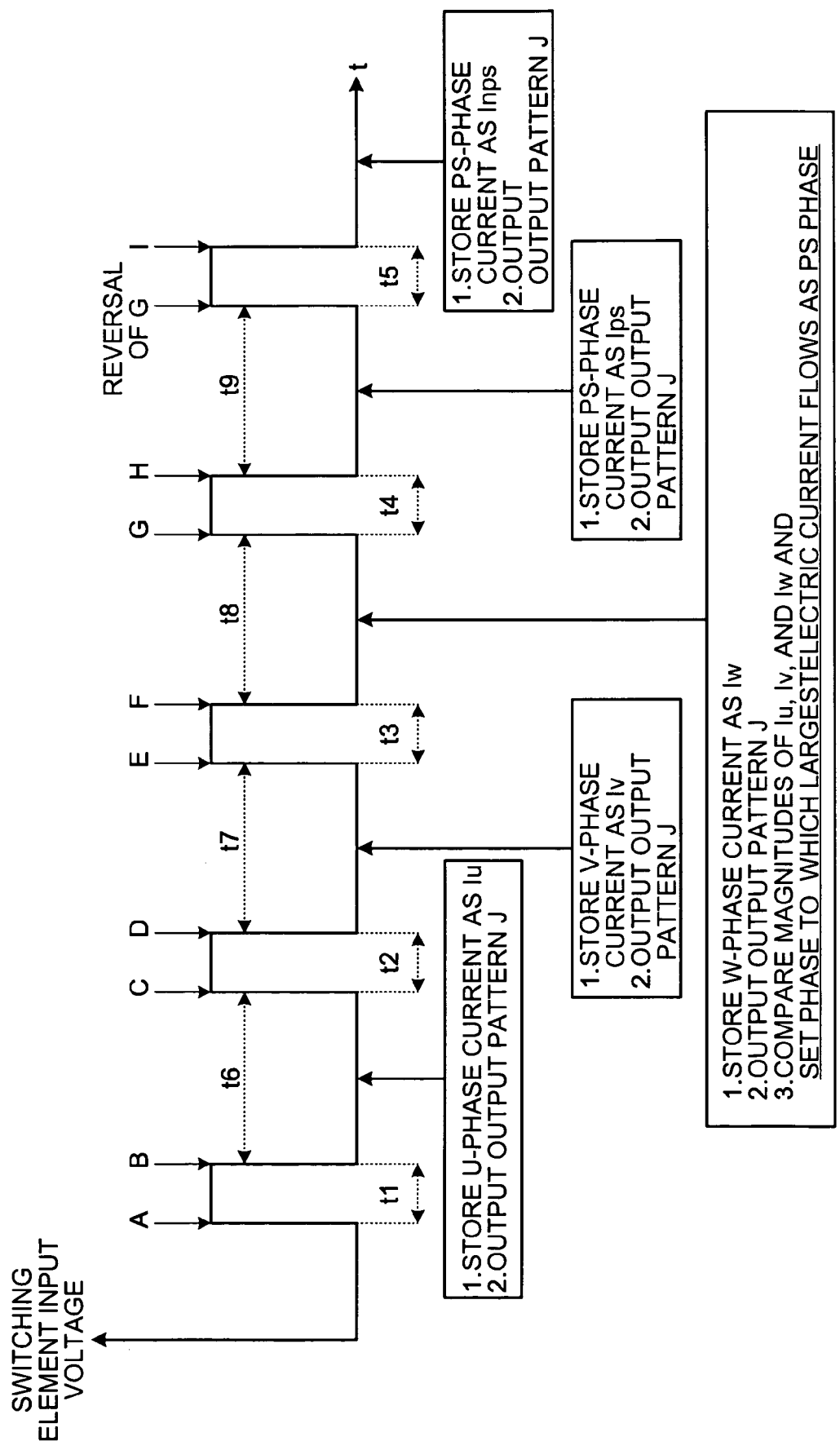
FIG. 4 is a schematic diagram for explaining a pulse output process of a shot-pulse control unit.

FIGS. 3 and 4 are diagrams for explaining a pulse output process of the shot-pulse control unit and ON/OFF states of respective gates of an inverter. Points A to J shown in FIG. 4 correspond to A to J shown in FIG. 3. The point A shown in FIG. 4 indicates that a pulse signal as well as an electric current to the U phase of the stator of the motor 3. As states of the respective gates at that point, a U-phase gate of an upper arm and V-phase and W-phase gates of a lower arm are in the ON state. A time width t1 of the pulse signal has to be set to a minimum time during which the rotor of the motor does not rotate. Depending on a moment of inertia of the pulse signal and a magnitude of the electric current, the minimum time is set to, for example, time equal to or shorter than $\frac{1}{100}$ second. As it is seen from a column B shown in FIG. 3, when the time t1 elapses, only the V phase and W phase of the lower arm come into the ON state and the pulse signal falls. Only the V phase and the W phase of the lower arm are in the ON state because, if the V phase and the W phase of the lower arm are immediately set to OFF, a counter electromotive force is applied to the stator of the motor and it becomes difficult to acquire a current value generated by the shunt resistor.

When the pulse signal to the U phase falls, during an interval of a time width t6, the current detecting unit acquires and stores a current value Iu. Since the time width t6 is only required to have time sufficient for acquisition and storage of the current value Iu, about 1/10 second is enough. Similarly, output of pulse signals to the V phase (C and D in the figure), acquisition and storage of a current value Iv in a time width t7, output of pulse signals to the W phase (E and F in the figure), and acquisition and storage of a current value Iw in a time width t are performed. The time widths t2 and t3 shown in FIG. 6 should be time equivalent to the time width t1. The time widths t7 and t8 should be time equivalent to the time width t6.

Figure 5:
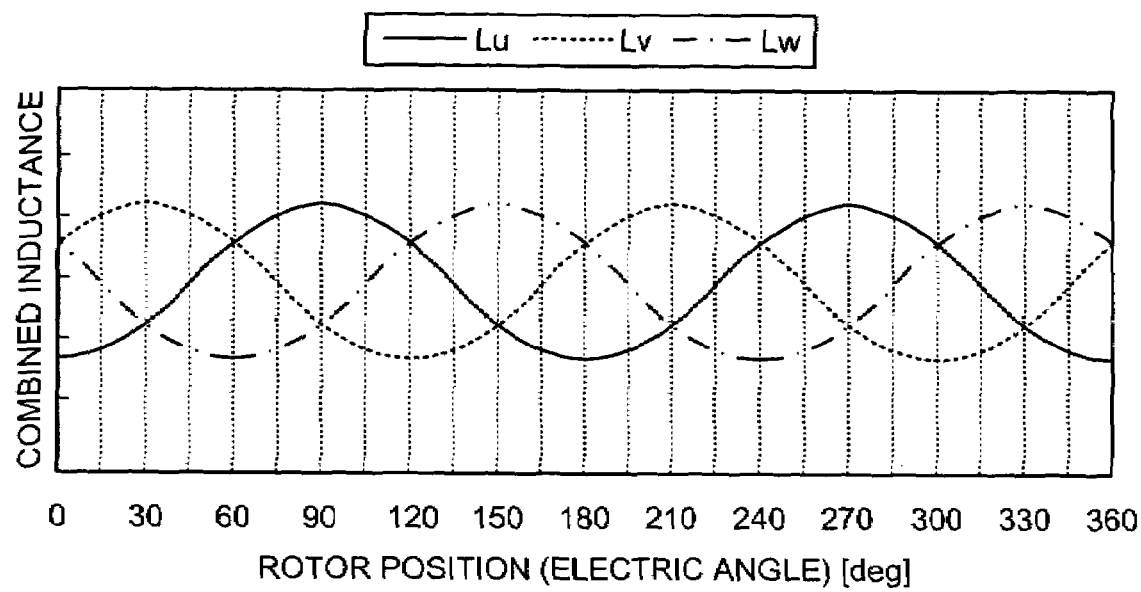
FIG. 5 is a graph of a rotor position (an electric angle) and inductances of respective phases.
Figure 6:
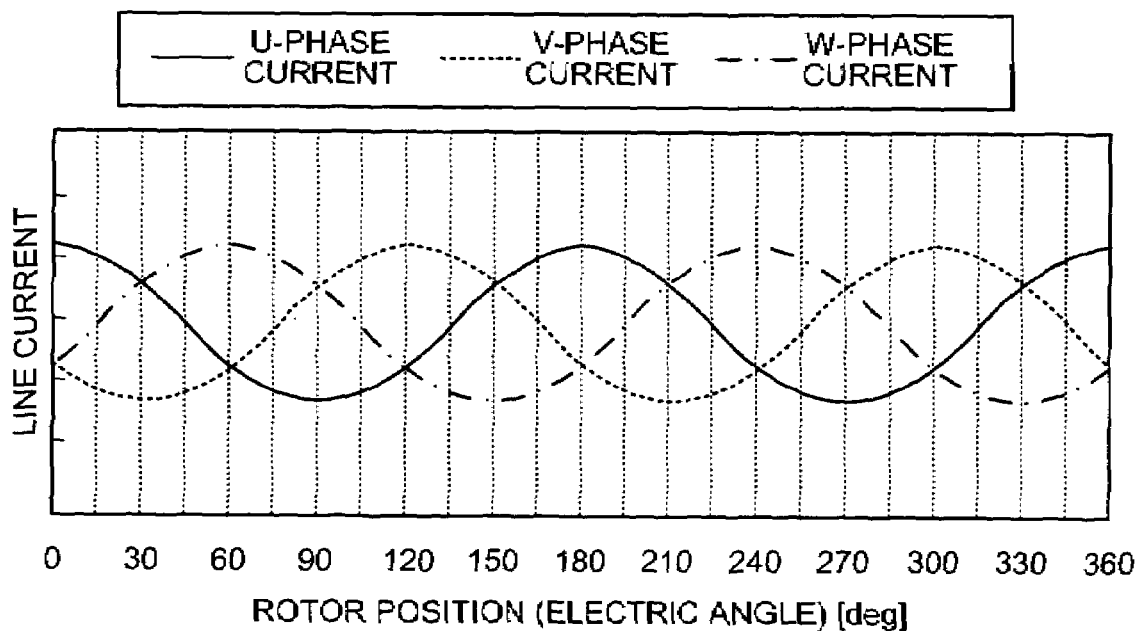
FIG. 6 is a graph of a rotor position (an electric angle) and line currents of respective phases of a stator.

The present invention utilizes a difference in inductances of respective phases of a stator depending on a rotor position of a motor. FIG. 5 is a graph of a rotor position (an electric angle) and inductances of respective phases. It is known that, in a four-pole motor, inductances of respective phases change at a period of 180 degrees. Difference of inductances means difference in easiness of flow of an electric current. Therefore, as shown in FIG. 6, values of electric currents flowing to the respective phases also change according to the inductances. As a tendency, easiness of flow of an electric current is the same in current supply in a minimum time width.

In the embodiment, a rotor position of a motor is estimated utilizing the characteristics described above. When the number of poles of a motor is two, a rotor position is estimated in this way. However, since a change in an inductance is at a period of 180 degrees in the four-pole motor as described above, even if one current value is known, there are two rotor positions corresponding to the current value. Thus, it should be further estimated in which position the rotor is located. This estimation utilizes difference in polarities (an N pole or an S pole) of permanent magnets of the rotor opposed to each other in the respective positions.

Figure 7:
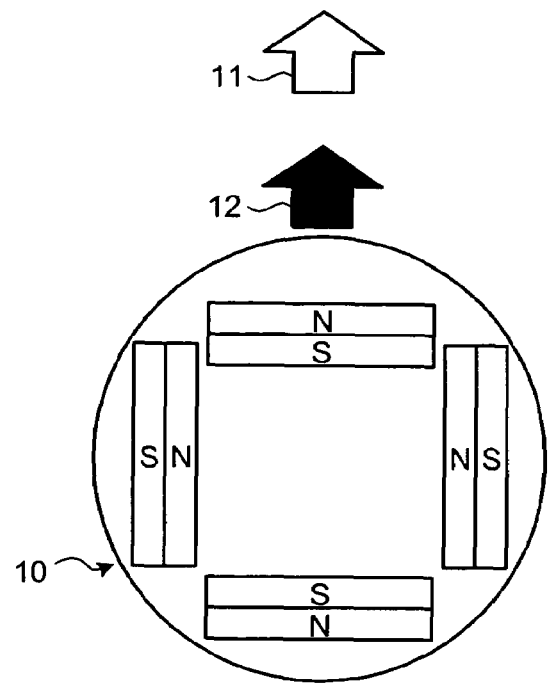
FIG. 7 is a schematic diagram for explaining a principle of polarity determination.
Figure 8:
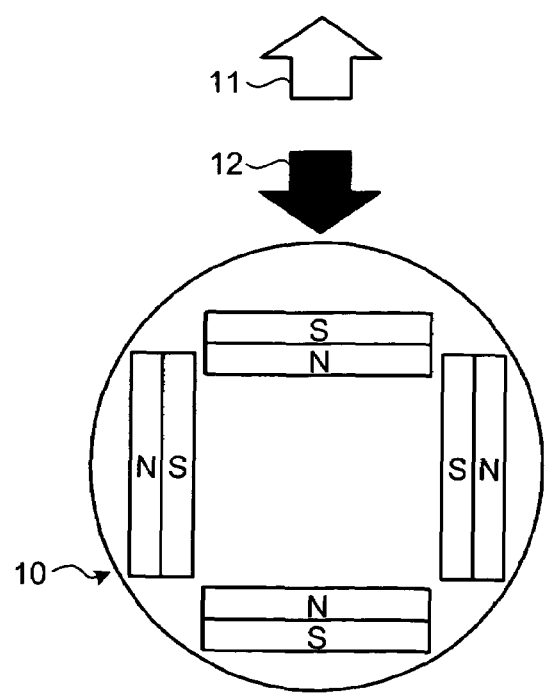
FIG. 8 is a schematic diagram for explaining the principle of polarity determination.

FIGS. 7 and 8 are schematic diagrams for explaining a principle of polarity determination for a rotor. FIG. 7 illustrates an example in which a magnetic flux 11 due to an electric current of a stator is in a magnetizing direction with respect to a magnetic flux 12 of permanent magnets of a rotor 10 (opposed to the N pole). As shown in FIG. 8, an absolute value of an electric current in this case is larger than that when the magnetic flux 11 due to the electric current of the stator is in a demagnetizing-direction with respect to the magnetic flux 12 of the permanent magnets (opposed to the S pole). A difference of the absolute values of the electric current is caused because a degree of decrease in an inductance due to magnetic saturation changes according to a direction of a magnetic pole. In other words, as in the case shown in FIG. 7, when a direction of the magnetic flux 11 due to the electric current and a direction of the magnetic flux 12 due to the permanent magnets are the same, since the magnetic saturation easily occurs and the inductance decreases, the absolute value of the electric current increases. Conversely, as in the case shown in FIG. 8, when a direction of the magnetic flux 11 due to the electric current is opposite to a direction of the magnetic flux 12 due to the permanent magnets, since the magnetic saturation less easily occurs and the inductance increases, the absolute value of the electric current decreases.

Since this characteristic is utilized, the shot-pulse control unit explained with reference to FIGS. 3 and 4 sends pulse signals to inverter circuits corresponding to the U, V, and W phases of the stator of the motor (A to F in the figures). The shot-pulse control unit sets a phase having a largest value of an electric current flowing thereto (a phase to which the magnet is opposed) as a PS phase and applies a negative voltage to the phase (see reversal of G in the figures). The shot-pulse control unit compares electric currents when the negative voltage is applied and when a positive voltage is applied to the phase (G in the figures). Consequently, a rotation directional position (orientation) of the rotor in the motor having the four poles is estimated.

FIG. 9 is a table of electric currents flowing to respective phases of a motor stator and estimated positions of a rotor. From the figure, it can be estimated that, for example, when the current value Iu when the pulse signal is applied only to the U phase is the largest and a magnitude of the current value Iv when the pulse signal is applied only to the V phase and the current value Iw when the pulse signal is applied only to the W phase are the same, a rotor position is at 0 degree or 180 degrees. The 0 degree is at a position where a magnetic field direction of the rotor is exactly opposed to a stator winding of the U phase. A current value I+ when a positive voltage is applied and a current value I− when a negative voltage is applied are compared. If the current value I+ when the positive voltage is applied is larger, it is estimated that a rotation directional position (a direction) of the rotor is not 180 degrees but is 0 degree. In the figure, a sign "=" indicates that current values may be judged as equal when the current values are within an appropriate range taking into account an actual error.

Similarly, it is possible to estimate a rotor directional position of the rotor of the motor having four poles by comparing magnitudes of current values a, b, and c of respective phases stored in the current detecting unit, a current value d when a positive voltage is applied to a phase having maximum values among the current values a, b, and c, and a current value e when a negative voltage is applied to the phase. This estimated position is sent to the steady driving control unit of the motor. A stator current controlled in association with the position makes it possible to immediately perform synchronous operation.

Therefore, since the rotor does not become unstable during starting and the compressor connected to the rotor is stabilized, noise is not caused. In other words, it is possible to perform smooth start. In addition, failure in start is eliminated. In the vehicle-mounted air conditioner driven with the stationary DC battery as a power supply, elimination of wasteful use of a battery is required. Thus, the control device according to the present invention without failure in start is extremely effective. Moreover, it is possible to shift from start control to synchronous operation control. This leads to improvement of efficiency of the air conditioner.

In this embodiment, an electric compressor used for circulation of a coolant in the vehicle-mounted air conditioner is explained. In the electric compressor, a permanent-magnet synchronous motor is built in a housing of the compressor or the motor is connected to the compressor on the outside of the compressor. A compressor body assumes a scroll shape, a slanted plate shape, and the like. It is possible to apply the present invention to any of the shapes without depending on an arrangement of the motor with respect to the compressor and a type of the compressor.

Figure 10:
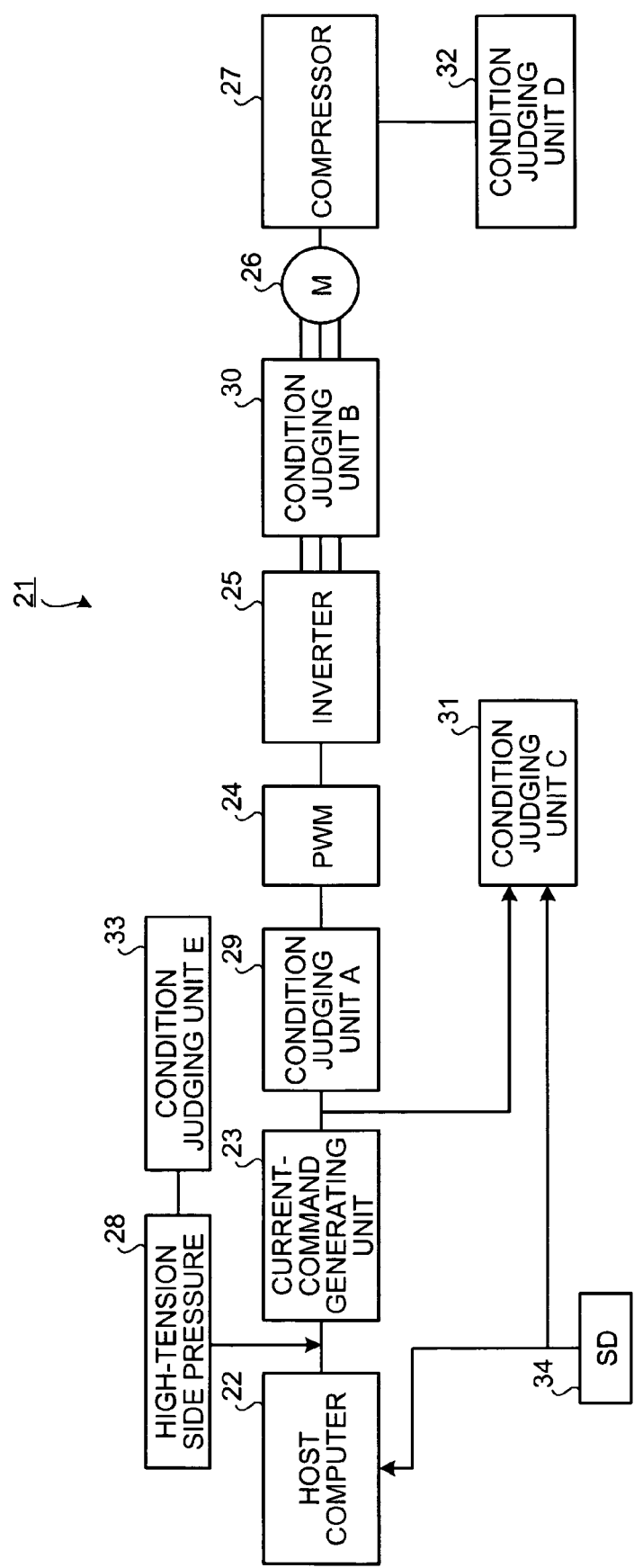
FIG. 10 is a block diagram of a basic configuration according to the embodiment.

FIG. 10 is a block diagram of a basic configuration according to the embodiment. A control device 21 for the electric compressor generally includes a host computer 22, a current-command generating unit 23, a PWM circuit 24, an inverter 25, a permanent-magnet synchronous motor (hereinafter, "motor") 26, a compressor 27, a high-tension side pressure acquiring unit 28 for the compressor, and five condition judging units 29, 30, 31, 32, and 33.

The five condition judging units are separated for convenience of explanation. However, it is not always necessary to provide the condition judging units individually. The condition judging units may be consolidated as one condition judging unit. The current-command generating unit 33 is a unit in which arithmetic operations for generating a current command are integrated. Specifically, in general, the current-command generating unit 33 includes a three-phase/two-phase converting unit, a d/q axis converting unit that converts a coordinate system to a rotor-based coordinate system, an excitation current operation unit, a torque current operation unit, and a two-phase/three-phase converting unit.

The host computer 22 that controls the entire air conditioner gives command about a number of revolutions and torque to the motor 26 to drive the compressor according to an output required of the apparatus. In the next current-command generating unit, a current command, which is a command value of an electric current required for the motor 26, is calculated from the number of revolutions command and the torque command. The current command is converted into an actual electric current via the PWM circuit and the inverter 25. A rotor of the motor 26 rotates in synchronization with a rotation magnetic field due to the electric current. Consequently, the compressor, which operates in association with the rotor, operates to circulate a coolant of the air conditioner. Functions and actions of respective components including the high-tension side pressure acquiring unit 28 and the respective condition judging units A29, B30, C31, D32, and E33 are explained below.

Figure 11:
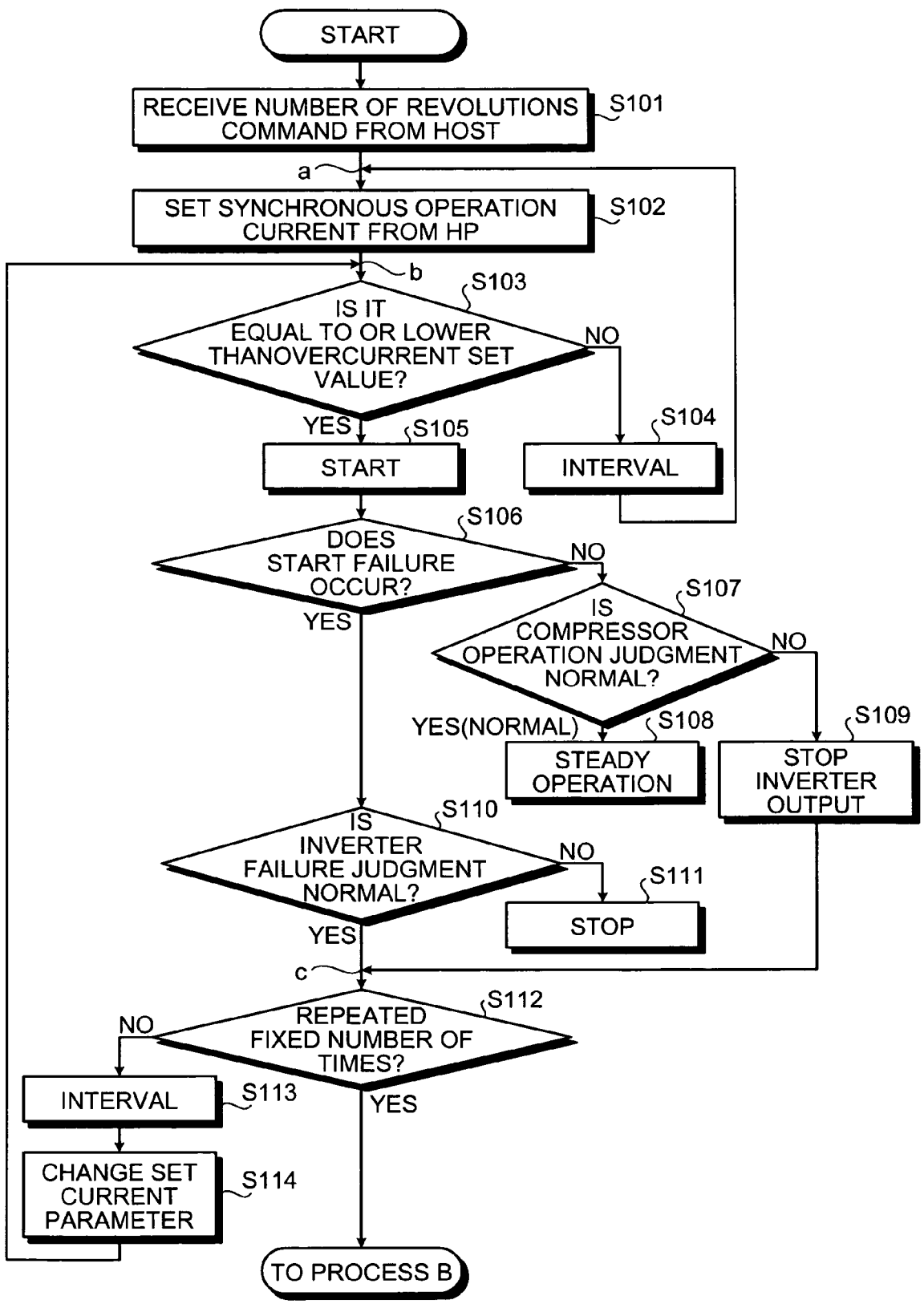
FIG. 11 is a flowchart of a basic process according to the embodiment.

FIG. 11 is a flowchart of a basic process according to the embodiment. As described above, in this embodiment, the basic process starts when the control device 21 receives the number of revolutions command or the torque command from the host computer 22 as an electric signal or a signal value generated by software (step S101). Subsequently, the control device 21 takes into account a high-tension side pressure of the compressor obtained by the high-tension side pressure acquiring unit to calculate a set value of a synchronous operation current serving as a basis of a current value calculation (step S102). Steps S101 and S102 are performed in the current-command generating unit 23 shown in FIG. 10. The high-tension side pressure acquiring unit is convenient because it is possible to realize the high-tension side pressure acquiring unit at low cost if a sensor conventionally provided downstream a compressor and upstream a condenser is used to detect a state of danger in use of the compressor.

The control device 21 judges whether a synchronous operation current set value is equal to or lower than an overcurrent set value (step S103). This judgment is performed in the condition judging unit A29 shown in FIG. 10. In this step, if the synchronous operation current set value is larger than the overcurrent set value determined in advance by an experiment or the like, the synchronous operation current set value causes failures in the PWM circuit, the inverter, and the motor. Thus, the control device 21 enters a standby state for a predetermined time, for example, at an interval of five seconds (step S104). The control device 21 facilitates arithmetic processing for the synchronous operation current set value taking into account the high-tension side pressure of the compressor acquired by the high-tension side pressure acquiring unit again (step S102). The control device 21 enters a standby state for the predetermined time to exclude contingency of fluctuation in the high-tension side pressure value and wait for stabilization of the pressure value.

If the synchronous operation current set value is equal to or lower than the overcurrent set value, the control device 21 shifts to start processing for the motor through the PWM circuit and the inverter (step S105). If overcurrent due to hardware or start failure due to an emergency stop (hereinafter, "shutdown (SD)") occurs, the control device 21 performs inverter failure judgment (steps S106 and S110). Specifically, this judgment is performed in the condition judging unit C31 shown in FIG. 10. If it is judged that the inverter is not normal, the inverter has abnormality and it is dangerous to continue the operation. Thus, the control device 21 performs processing for, for example, presenting an indication urging necessity for maintenance to an operator and stops the motor operation (step S111).

The inverter failure judgment is performed in patterns shown in FIG. 12. When the SD signal is normal, that is, there is no reason for emergency stop and when an overcurrent is not detected as an arithmetic operation value (as software), it is judged that the inverter is normal. When the SD signal is normal and an overcurrent is detected as an arithmetic operation value, it is judged that required torque is excessively large due to some cause. This also forms a reason for stop. The overcurrent detection by software acts when current values of respective power supplies of the U, V, and W phases exceed the overcurrent set value of the software.

When the SD signal detects an overcurrent in hardware such as the inverter and when an overcurrent is not detected as an arithmetic operation value, that is, the SD signal is normal, it is judged that the inverter is abnormal. When an overcurrent is not detected by software of an arithmetic operation but an overcurrent is detected by hardware of an electric circuit, for example, in the case of arm short-circuit or the like of an inverter circuit, the inverter is judged as abnormal in this way. When the SD signal detects an overcurrent in the hardware such as the inverter and when an overcurrent is also detected as an arithmetic operation value, it is judged that the inverter is abnormal. For example, in the case of arm short-circuit or the like of the inverter circuit, the inverter is judged as abnormal in this way.

The SD signal is a signal for, when the overcurrent set value set on the hardware (circuit) is exceeded, immediately stopping the PWM drive circuit and sending information to the host computer to stop operation in the software manner according to interrupt processing. The SD signal is transmitted, for example, when an overcurrent is detected in the hardware and when an integrated computer of a vehicle needs to cause other devices affecting human lives like an anti-lock brake system (ABS) and an electric power steering to preferentially function as a use of a stationary power supply. In the latter case, the devices are immediately stopped to avoid power consumption of the compressor and secure a power supply capacity.

When the start processing is performed and there is neither overcurrent due to the hardware or the software (the arithmetic processing) nor transmission of an SD signal, the control device 21 performs compressor operation judgment (step S107). This is performed in the condition judging unit D32 shown in FIG. 1. Specifically, in the compressor operation judgment, it is judged that the compressor normally operates if a maximum value of an absolute value of an inverter output current in one second is larger than a predetermined current value when a predetermined time elapses after an inverter output reaches a value equivalent to a requested number of revolutions.

The predetermined current value depends on a type and a size of the motor and a type and a size of the compressor. However, the predetermined current value only has to be set to a current value at which lowest torque of the motor is obtained within operation conditions of the compressor, for example, a current value of about 3 amperes. When it is judged that the compressor normally operates, the control device 21 considers that no problem occurs for start and shifts to steady operation (step S108). When it is judged that the compressor is abnormal, for example, when the current value is excessively small, the control device 21 stops the inverter output (step S109) and temporarily stops the motor. Thereafter, the arithmetic operation is returned to the point c shown in FIG. 2 to be put on a logical loop equivalent to restart. At the point c and the subsequent points, when it is judged at step S103 and the subsequent steps that abnormality has occurred, the control device 21 judges whether the judgment is repeated for a predetermined number of times of repetition (step S112). This number of times is set to several times, for example, about three times to minimize wasteful time and wasteful consumption of the power supply due to a start failure.

When it is judged at step S103 and the subsequent steps that abnormality has occurred, if the judgment is repeated for the number of times equal to or smaller than the predetermined number of times of repetition, the control device 21 takes an interval, that is, enters a standby state for the predetermined time (step S113), changes set current parameters, and returns the processing to the point b shown in FIG. 2. The change of the set current parameters means, specifically, that a value obtained by adding several amperes to the synchronous operation current set value at step S102 in a range not exceeding the overcurrent set value is set as a new current set value. This is for the purpose of allowing an overcurrent when torque is insufficient and a current value is judged as the overcurrent because a current set value set first is too small.

The control process immediately after start in the present invention is as described above. When it is judged for the predetermined number of times in the process that abnormality has occurred, the control device 21 proceeds to a process B following the control process. Except when torque for rotating the compressor is abnormally large and when abnormality such as short circuit occurs in the circuit, usually, the judgment indicates that the compressor operation is normal. The control device 21 shifts to the steady operation (step S108).

Figure 13:
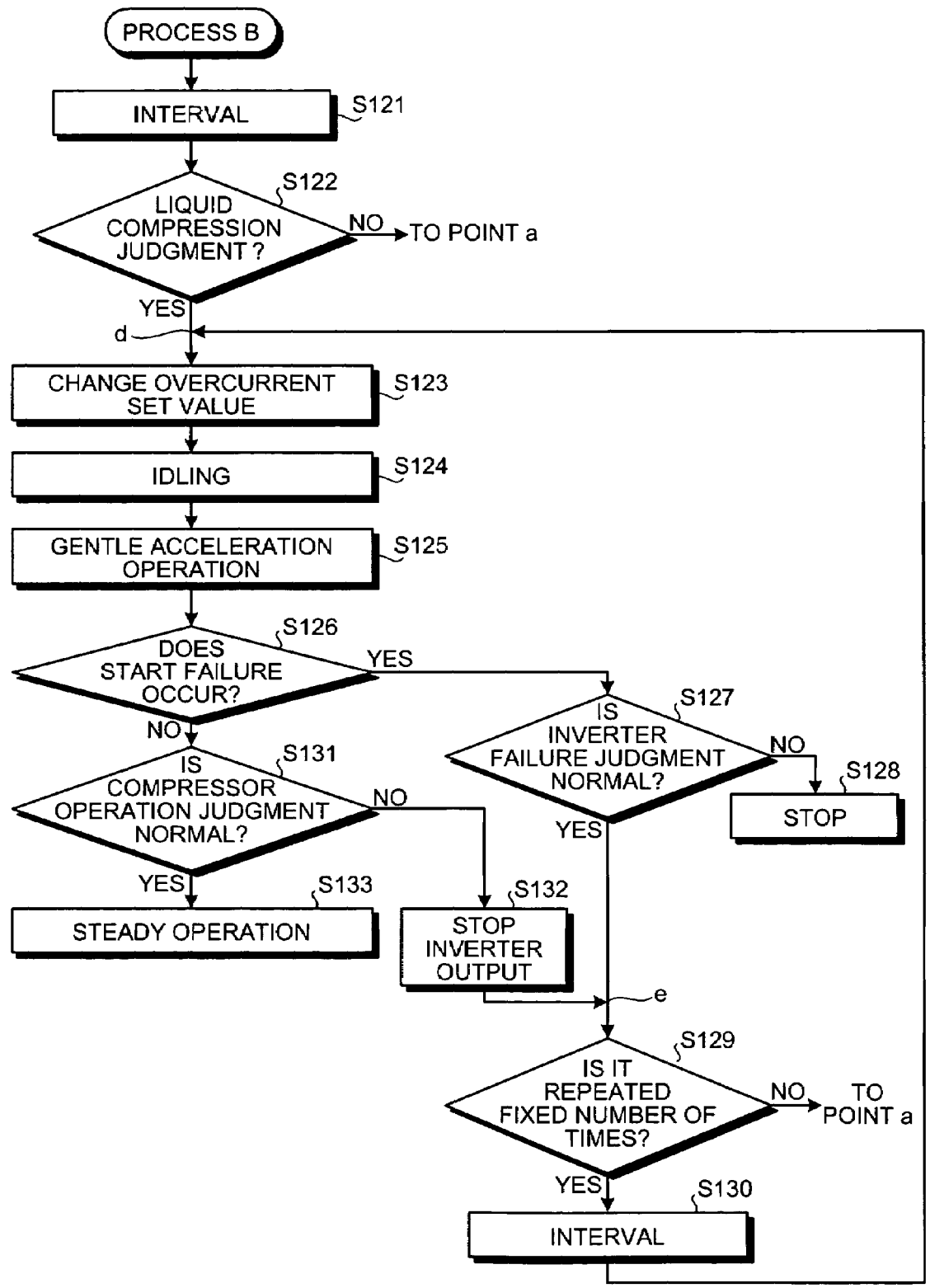
FIG. 13 is a flowchart of a process B of a condition judging unit.

FIG. 13 is a flowchart of the process B in the condition judging unit. In the process B, since abnormality is repeated for plural number of times in the superior processing of the process B, the control device 21 puts the system on standby at an interval, that is, for a predetermined time such as several seconds (step S121). Consequently, states of the compressor and the motor are stabilized. Subsequently, the control device 21 performs liquid compression judgment (step S122). The liquid compression judgment is judgment for judging whether unexpectedly high torque is required for compression because a coolant to be compressed by the compressor is liquidized. Specifically, it is judged whether a high-tension side pressure value of the compressor is smaller than a predetermined pressure. This is because a large high-tension side pressure value indirectly indicates that the coolant is not liquidized. A value of the predetermined pressure is calculated by an experiment or a simulation. Depending on performance of the compressor, for example, a pressure of about 1.3 Mpa is set as the predetermined pressure. This processing is performed in the condition judging unit E33 shown in FIG. 10.

In this liquid compression judgment, to more firmly ground the liquidation of the coolant, it may be judged that a difference between a high-tension side pressure and a low-tension side pressure of the compressor is equal to or lower than the predetermined pressure. Since the difference between the high-tension side pressure and the low-tension side pressure is a difference between pressures applied at both ends of the compressor, it is possible to indirectly estimate the liquidation of the coolant. This is because the coolant is liquidized when the pressure difference is small. Therefore, if a relation between the difference and the liquidation of the coolant is grasped in advance by an experiment or the like and a critical value of the liquidation is set as a set value, when the difference is equal to or lower than the set value, it is possible to more accurately estimate whether the coolant is liquidized, which may lead to processing after that. For example, if the differential pressure is equal to or lower than 100 kilo Pascal-gauge (kPaG), the control device 21 judges that the coolant is liquidized and shifts the processing to the next step.

It is also possible to estimate a coolant pressure on the low-tension side of the compressor from a pressure obtained from the high-tension side pressure acquiring unit of the compressor. Specifically, a low-tension side pressure when it is assumed that the pressure obtained from the high-tension side pressure acquiring unit is in an equilibrium state with a low pressure on the low-tension side of the compressor is derived based on the high-tension side pressure. A function and a table calculated by an experiment or the like in advance are used for this derivation.

If a high-tension side pressure and a low-tension side pressure can be grasped, it is also possible to calculate a difference between both the pressures. A value of the difference serves as an indicator for judging whether the liquidation of the coolant occurs. It is possible to roughly calculate torque for starting the compressor, to which the differential pressure is applied, from the pressure difference. Therefore, if the torque calculated from the difference between the high-tension side pressure and the low-tension side pressure as described above is converted into a current value, it is possible to use the current value in changing the overcurrent set value in the next step s123. It is possible to bring start torque closer to torque actually required for the motor by changing the torque once.

As a further example of application, a lower-tension side coolant pressure P estimated from the high-tension side pressure may be multiplied by a value of $C1*(t0-t1)*V/F$, where t1 is a blowout temperature of an evaporator, t0 is an intake temperature of the evaporator, V is a blower air volume of the evaporator, F is a number of revolutions of the compressor before stop, and C1 is a constant calculated by an experiment or a simulation.

It can be said that, after the compressor stops, the low-tension side pressure is less easily maintained as an air conditioning system applies more work on the air. Examples of factors for judging whether the low-tension side pressure is less easily maintained include a value obtained by subtracting the blowout temperature t1 of the evaporator from the intake temperature t0 of the evaporator, the blower air volume V of the evaporator, and the number of revolutions F of the compressor before the last stop. If the value obtained by subtracting the blowout temperature t1 of the evaporator from the intake temperature t0 of the evaporator is large, since the work is large, it can be said that the low-tension side pressure is less easily maintained.

When the blower air volume V is large, the low-tension side pressure is less easily maintained as well. When the number of revolutions F of the compressor before the last stop is large, the low-tension side pressure is less easily maintained as well. Therefore, if the low-tension side pressure P is multiplied by a value obtained by multiplying these factors by an appropriate constant, it is possible to derive and estimate a more accurate low-tension side pressure. As a result, torque required for start of the motor and an applied voltage for generating the torque are accurately calculated.

Since the above equation is obtained from a physical observation, other than $C1*(t0-t1)*V/F$, $C1*(t0-t1)$ alone is effective for estimation of a low-tension side pressure. $C2*V$ and $C3*(1/F)$ using constants C2 and C2 calculated from an experiment or a simulation are effective.

The low-tension side pressure P may be multiplied by an attenuation function $\exp(-C4*t)$, where an elapsed time t after the compressor stops is a parameter and C4 is a coefficient calculated by an experiment or a simulation. This calculation is performed to approximately calculating a high-tension side pressure of the compressor because the pressure falls according to an elapsed time after the compressor stops. Consequently, it is possible to estimate a low-tension side pressure that gently fluctuates according to the elapsed time t after the compressor stops. The attenuation function is not limited to the form described above. It is possible to experimentally use an attenuation function suitable for pressure fall.

In the equation described above, t may be acquired by associating a clock or a timer generally provided in a car with the stop of a compressor in a control device for an electric compressor, an air conditioner, or a vehicle-mounted air conditioner. In addition, t may be treated as described below.

First, a fin temperature of the evaporator and an intake temperature of the evaporator are acquired by a sensor or the like conventionally used for temperature control for the air conditioner. Subsequently, when a difference between the fin temperature and the intake temperature is equal to or larger than a threshold value stored in a recording unit of the control device in advance, a blower is rotated for a specific time at a specific air volume while the compressor stop state is maintained. Simultaneously, the fin temperature and the intake temperature are started to be acquired at every certain sampling time. A rate of change of a difference between the fin temperature and the intake temperature that changes in time series is calculated. The elapsed time t is derived according to a relation between the elapsed time t and the rate of change calculated in advance. The relation between the rate of change and the elapsed time t from the stop is obtained by an experiment or the like in advance. A function or a table that can calculate t from the rate of change is prepared.

When the difference between the fin temperature and the intake temperature is equal to or smaller than the threshold value, considering that a sufficient time elapses after the compressor stops and a coolant pressure is in the equilibrium state, the elapsed time t is set to a sufficiently long time, for example, sixty minutes.

When the blower is rotated for the specific time at the specific air volume, it is possible to actively reduce loads on the compressor. In that state, it is possible to acquire a fin temperature and an intake temperature of the evaporator at fixed intervals, calculate a rate of change (a derived function) of a difference between the fin temperature and the intake temperature, and estimate t according to a relation obtained in advance from the rate of change. The relation between the rate of change and t is obtained by an experiment or the like in advance. In this way, even if t is not directly calculated by the timer or the like, it is possible to calculate approximate time t according to an arithmetic operation using the fin temperature and the intake temperature.

Referring back to FIG. 13, when it is judged that the coolant is liquidized, the control device 21 changes the synchronous operation current set value at step S102 (including the value added at step S114) to a value obtained by subtracting a predetermined value from the overcurrent set value set at that point (step S123). If this predetermined value is, for example, about 5 amperes and the overcurrent set value is 50 amperes at that point, the synchronous operation current set value is 45 amperes. It is possible to compress the liquidized coolant with large torque. As a result, the motor is smoothly started.

Subsequently, to facilitate evaporation of the coolant, the control device 21 performs an idling operation of the motor (step S124). The idling operation is an operation for rotating the motor at a fixed low number of revolutions for a predetermined time. For example, the idling operation only has to be an operation for rotating the motor at 180 min$^{-1}$ for about five seconds.

When the idling operation ends, the control device 21 rotates the motor at a gentle angular acceleration (step S125). For example, the control device 21 rotates the motor at an angular acceleration of 7200 min$^{-2}$. Consequently, low-speed start same as the usual start control is performed. Even after these steps (steps S123 to S125) are executed, the control device 21 judges whether a start failure has occurred (step S126). This processing is performed in the condition judging unit C shown in FIG. 1 in the same manner as step S106.

As at steps S107, S108, and S109, when there is neither an overcurrent due to hardware or software nor transmission of an SD signal, the control device 21 performs compressor operation judgment (step S131). This is performed in the condition judging unit D shown in FIG. 10. Specifically, in the compressor operation judgment, when a maximum value of an absolute value of an inverter output current in one second is larger than a predetermined current value when a predetermined time elapses after an inverter output reaches a value equivalent to a requested number of revolutions, it is judged that the compressor normally operates.

The predetermined current value depends on a type and a size of the motor and a type and a size of the compressor. However, the predetermined current value only has to be set to a current value at which lowest torque of the motor is obtained within operation conditions of the compressor, for example, a current value of about 3 amperes. When it is judged that the compressor normally operates, the control device 21 considers that no problem occurs for start and shifts to steady operation (step S133). When it is judged that the compressor is abnormal, for example, when the current value is excessively small, the control device 21 stops the inverter output (step S132) and temporarily stops the motor.

Thereafter, the control device shifts the processing to the point e shown in FIG. 13 to put the processing on a logical loop equivalent to restart. When it is judged at steps S126 and S127 that abnormality has occurred, the control device 21 judges whether the judgment is repeated for a predetermined number of times of repetition (step S129). This number of times is set to several times, for example, about three times to minimize wasteful time and wasteful consumption of the power supply due to a start failure.

When it is judged at steps S126 and S127 that abnormality has occurred, if the judgment is repeated for the number of times equal to or smaller than the predetermined number of times of repetition, the control device 21 shifts the processing to the point a shown in FIG. 10 and takes an interval, that is, enters a standby state for the predetermined time in start while judging whether an overcurrent occurs and an SD signal is received (step S130). The control device 21 changes set current parameters and returns the processing to the point d shown in FIG. 13. If it is judged at step S127 that the inverter is not normal, the inverter has abnormality and it is dangerous to continue the operation. Thus, the control device 21 performs processing for, for example, presenting an indication urging necessity of maintenance to an operator and stops the motor operation (step S128).

Consequently, in particular, it is possible to estimate torque appropriate for start of the motor according to an arithmetic operation of the compressor without attaching a special instrument anew. It is also possible to generate a voltage command for finally determining a voltage applied to the motor paying attention to liquidation of the coolant closely related to driving conditions of the motor. In the electric vehicles such as the FCEV and the hydrogen vehicle, a compressor of an air conditioner is driven with a battery as a power supply. It is known that, since various loads are connected to the battery, fluctuation in a voltage is large.

Even in such a case, the air conditioner attached to the vehicle is required to be smoothly started without consuming wasteful electric power. According to the present invention, it is possible to generate a voltage control signal taking into account driving conditions and loads of the compressor and perform smooth start. The compressor of the vehicle-mounted air conditioner is placed under severe cost competition as a product. However, in the present invention, since a high-tension side pressure acquiring unit, a current limiter of an inverter, and an SD signal transmitting mechanism are conventionally used for protection of the control device, it is possible to realize a reduction in cost simply by changing setting of an arithmetic operation unit of the control device.

It is also possible to cause the control device that performs the shot pulse control explained earlier to carry out the present invention explained above in a superimposed manner.

Figure 14:
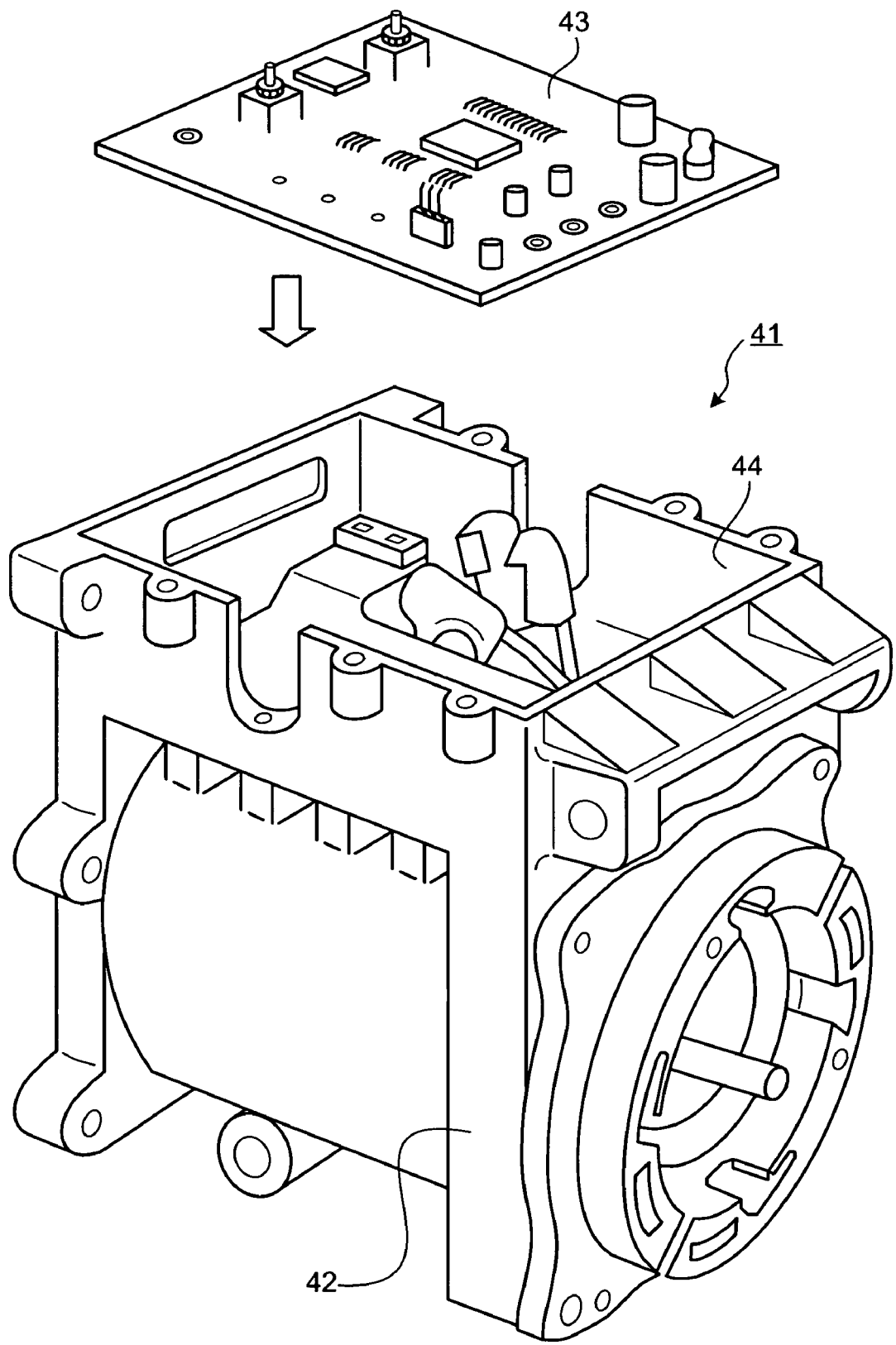
FIG. 14 is a schematic diagram of an electric compressor in which a control device is integrated with a housing of the electric compressor.

FIG. 14 is a schematic diagram of an electric compressor in which a control device is integrated with a housing of the electric compressor. A housing 42 of an electric compressor 41 has a box-like section 44 that can house a substrate 43 constituting the control device. The substrate 43 is housed in this section. A power supply from the outside of the electric compressor 41, electric signals from a temperature detectors and the like, an electric signal from a main control device of the air conditioning device, and the like are inputted to the substrate 43. An output of the substrate 43 is an electric current (a voltage) to the motor and an input to the motor provided inside the housing 42.

Figure 15:
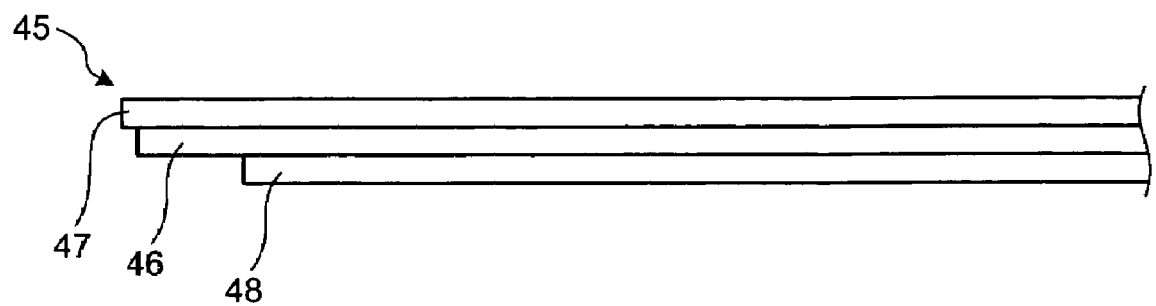
FIG. 15 is a cross-section of sheet-like magnetism-resistant section.

FIG. 15 is a cross-section of a sheet-like magnetism-resistant section used in the present invention. A sheet-like magnetism-resistant section 45 has a three-layer structure. An electrically conductive/thermally conductive layer 46 serving as an intermediate layer is formed of a material having electric conductivity and thermal conductivity. As a specific material, it is possible to use a metal foil of gold, silver, aluminum, copper, steel, or the like. On both sides of this electrically conductive/thermally conductive layer 46, insulating layers 47 and 48 formed of an insulating material are provided. Specifically, it is possible to use various kinds of synthetic resin having insulation properties such as polyethylene, polypropylene, fluorine resin, and ABS resin for the insulating layers 47 and 48. When it is desired to increase strength, it is advisable to use synthetic resin reinforced by a glass fiber.

As the insulating material, a so-called highly thermally conductive insulting material like highly thermally conductive silicone rubber or ceramics kneaded with silicon nitride, silicon oxide, aluminum oxide, magnesium oxide, or the like and sintered may be used for the insulating layers 47 and 48. The insulating layers 47 and 48 on both the sides of the electrically conductive/thermally conductive layer 46 may be manufactured in contact with the electrically conductive/thermally conductive layer 46 or may be stuck to the electrically conductive/thermally conductive layer 46 coated with the synthetic resin, the silicone rubber, or the like. Thickness of the electrically conductive/thermally conductive layer 46 and thickness of the insulating layers 7 and 8 are determined taking into account bending rigidity. For example, when the sheet-like magnetism-resistant section has to be formed in a considerably complicated shape three-dimensionally, total thickness of the layers is set to about 0.5 millimeter without setting the bending rigidity to high. In particular, since metal having relatively high bending rigidity is used for the electrically conductive/thermally conductive layer 46, in design, it is convenient to adjust the bending rigidity according to the thickness of the electrically conductive/thermally conducive layer 46.

Figure 16:
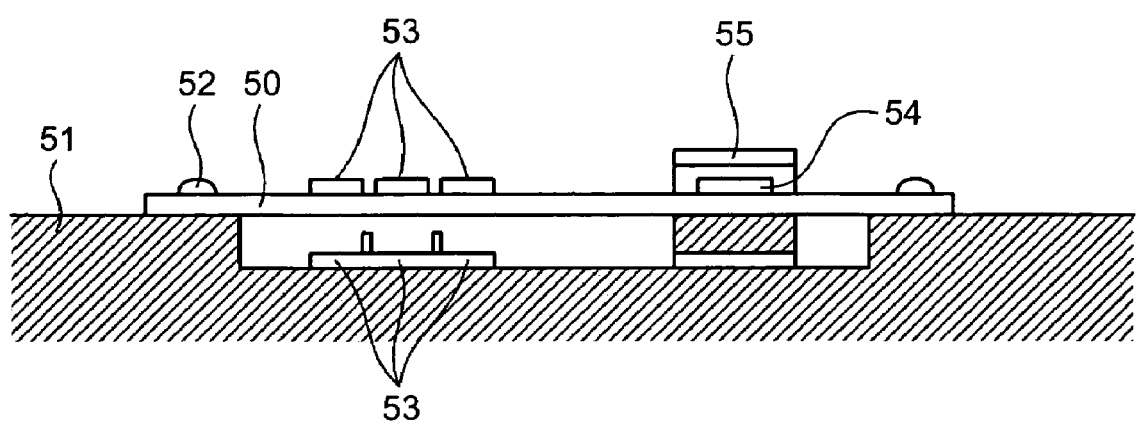
FIG. 16 is a schematic diagram for explaining application of the sheet-like magnetism-resistant section to a control substrate.
Figure 17:
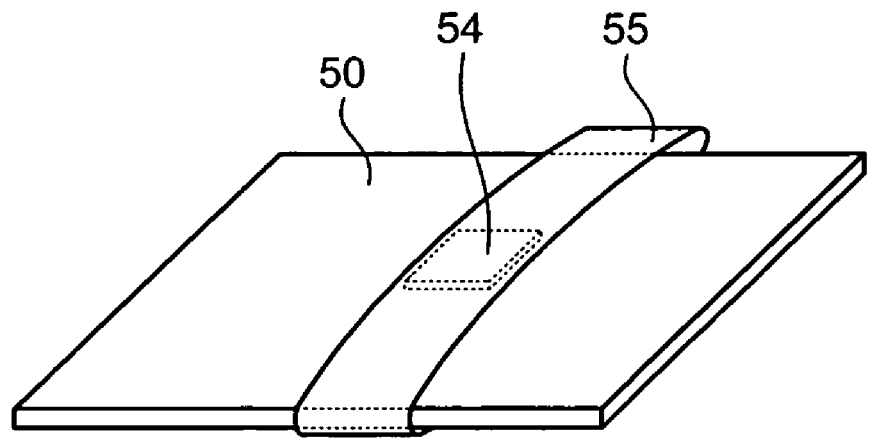
FIG. 17 is a schematic diagram for explaining the application of the sheet-like magnetism-resistant section.

FIG. 16 is a schematic diagram for explaining application of the sheet-like magnetism-resistant section to a control substrate. In general, a substrate 50 constituting the control device is fixed to a bottom 51 of the box-like section 44 shown in FIG. 14, which is the housing of the electric compressor, by screws 52 or the like. Switching devices 53 to which a large current flows and a central processing unit 54 are mounted on the substrate 50 or the switching devices 53 are fixed to the bottom 51 below the substrate 50. Electromagnetic wave noise emitted from the switching devices 53 is likely to cause malfunction of the central processing unit 54. Thus, the central processing unit 54 is covered by a sheet-like magnetism-resistant section 55. As shown in FIG. 17, components sensitive to electromagnetic wave noise such as the central processing unit 54 are covered by the sheet-like magnetism-resistant section 55 in a belt shape.

Figure 18:
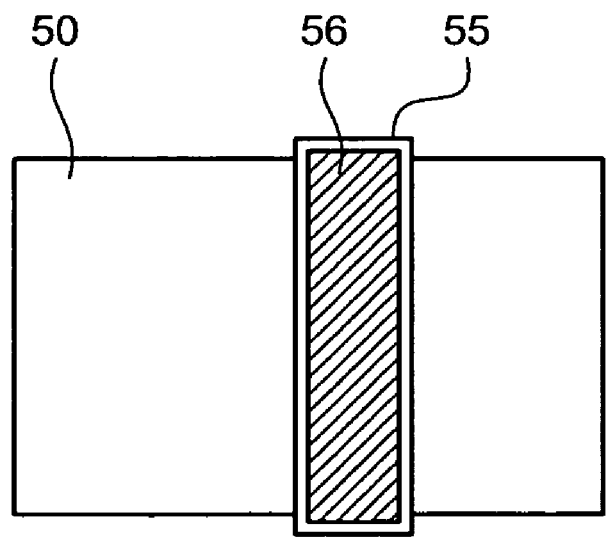
FIG. 18 is a schematic diagram of a rear side of the substrate.

FIG. 18 is a schematic diagram of a rear side of the substrate 55. On the rear side of the substrate 55, an insulating material is peeled off from the sheet-like magnetism-resistant section 55 covering the substrate 50 in the belt shape to expose an electrically conductive/thermally conductive material. An exposed portion 56 is provided in contact with the housing (the bottom) 51 shown in FIG. 16. Consequently, a portion around the central processing unit 54 of the substrate 50 covered with the sheet-like magnetism-resistant section 55 is protected from noise. If the housing is grounded, an action of protecting the portion from noise is more surely shown. Since the surface of the sheet-like magnetism-resistant section 55 is formed of the insulating material, even if the sheet-like magnetism-resistant section 55 is brought close to a device, it is unnecessary to worry about short circuit between the devices. Moreover, since the sheet-like magnetism-resistant section 55 has the electrically conductive/thermally conductive layer formed of a metal foil having thermal conductivity, the sheet-like magnetism-resistant section 55 can conduct heat emitted from a device or heat from the outside and permit the heat to escape to the housing of the electric compressor having relative low temperature. The sheet-like magnetism-resistant section 55 using the foil or the like of the electrically conductive material basically becomes more flexible as the sheet-like magnetism-resistant section 55 is formed thinner. Thus, the sheet-like magnetism-resistant section 55 may be formed in a belt shape or may be stuck to a necessary portion.

A sheet-like magnetism-resistant section may be formed by sandwiching a metal foil with insulating layers using an insulting material, which makes it possible to perform high thermal conduction, such as highly thermally conductive silicone rubber or ceramics kneaded with silicon oxide, aluminum oxide, or magnesium oxide for the insulating layers. If the insulating layers are in contact with the housing or portions that can conduct heat to the housing, in addition to the heat conduction by the electrically conductive/thermally conductive layer, heat also escapes to the housing and the like from the insulating layers. Thus, cooling of the devices on the substrate is further facilitated. The highly thermally conductive material is a material having a thermal conductivity equal to or higher than about 3.0 watt per meter-Kelvin (W/mK).

Figure 19:
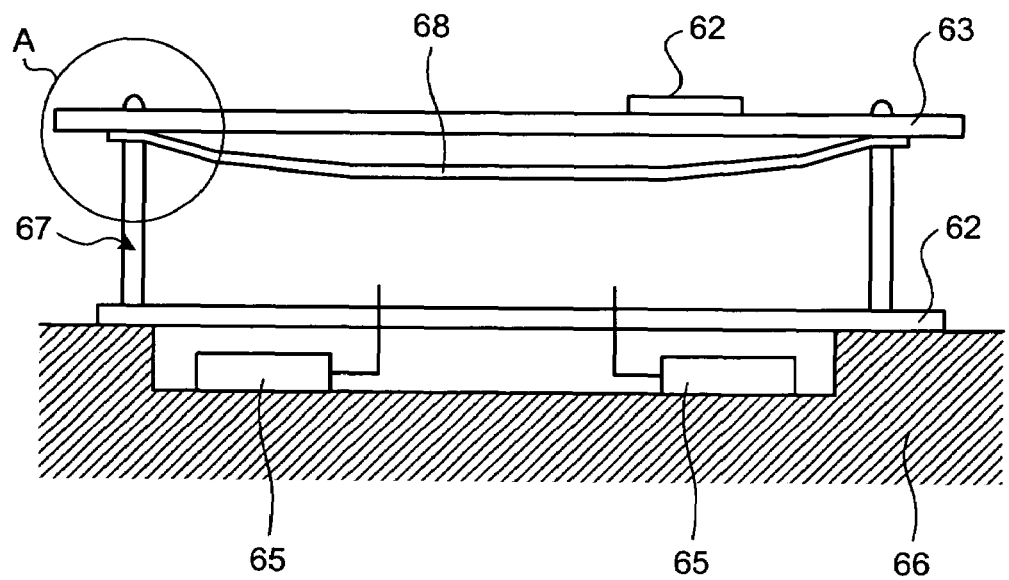
FIG. 19 is a schematic diagram of a substrate formed in upper and lower two stages and fixed to a housing.

FIG. 19 is a sectional view of a substrate consisting of upper and lower two stages fixed to a housing. When an area of a substrate constituting a control device is reduced, a substrate on which a power electronics device handling a large current is mounted and a substrate on which other devices are mounted may be provided in upper and lower two stages. In an example shown in the figure, a substrate 62 on which switching devices 65 such as IGBTs or FETs are mounted is provided at the lower stage and a substrate 63 on which a central processing unit 54 and the like are mounted is provided at the upper stage. It is also possible that, as shown in the figure, the switching devices 65 such as the IGBTs are mounted on the housing 66 by applying insulation processing to the housing 66 and terminals of the switching devices 65 are connected to the substrate 62 at the lower stage. The substrate 63 at the upper stage is supported by columns 67 of metal vertically provided in the housing 66 or the substrate 62 at the lower stage.

Figure 20:
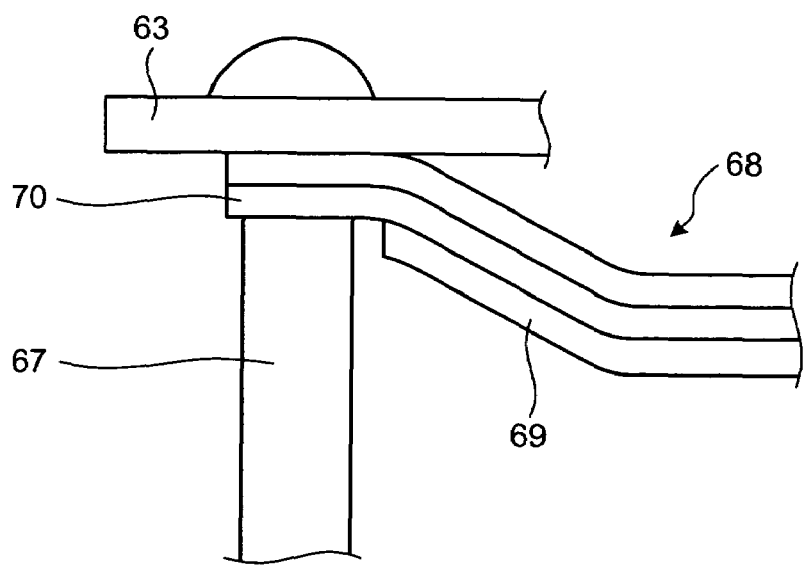
FIG. 20 a schematic diagram of the sheet-like magnetism-resistant section near a column.

A sheet-like magnetism-resistant section 68 according to the embodiment is provided to cover the entire rear side of the substrate 63 at the upper stage to prevent electromagnetic wave noise from the substrate 62 at the lower stage from affecting the devices mounted on the substrate 63 at the upper stage. Ends of the sheet-like magnetism-resistant section 68 are connected to the metallic columns 67. FIG. 20 is a schematic diagram of the sheet-like magnetism-resistant section 68 near the metallic column 67. The sheet-like magnetism-resistant section 68 is screwed to nip the metallic column 67 and the substrate 63. An insulating layer 69 on the lower side of the sheet-like magnetism-resistant section 68 is peeled off near the metallic column 67 such that an electrically conductive/thermally conductive layer 70 is exposed and provided in contact with the metallic column 67.

Consequently, the substrate in the portion covered by the sheet-like magnetism-resistant section 68 is protected from noise. It is preferable to ground the housing because an action of protecting the portion from noise is more surely shown. Since the surface of the sheet-like magnetism-resistant section 68 is formed of the insulating material, even if the sheet-like magnetism-resistant section 68 is brought close to a device, it is unnecessary to worry about short circuit between the devices. In reducing a size of the motor housing, it is important to know how close substrates can be brought to each other. Thus, even in such a case, the insulating effect of the present invention is useful.

If a highly thermally conductive insulating material is used for the insulting material, it is possible to conduct heat even from the upper surface of the sheet-like magnetism-resistant section 68. Thus, heat escapes to the housing from the upper surface via the metallic column 67. Even if the insulating layer 69 on the lower surface of the sheet-like magnetism-resistant section 68 is not peeled off near the metallic column 67 shown in FIG. 20, when the metallic column 67 is passed through the insulating layer 69, the electrically conductive/thermally conductive layer is inevitably exposed in a cut end of a through hole of the insulating layer 69. Thus, the insulating layer 69 does not hinder heat conduction. If the highly thermally conductive insulating material is used for the insulating material, cooling efficiency is improved because it is possible to conduct heat to the metallic column 67 from the insulating layers on both sides of the sheet-like magnetism-resistant section 68 as well. Moreover, the electric compressor used for the vehicle-mounted air conditioner has to withstand vibration from the vehicle. However, since the sheet-like magnetism-resistant section according to the present invention is flexible, the sheet-like magnetism-resistant section can withstand vibration and is useful.

Figure 21:
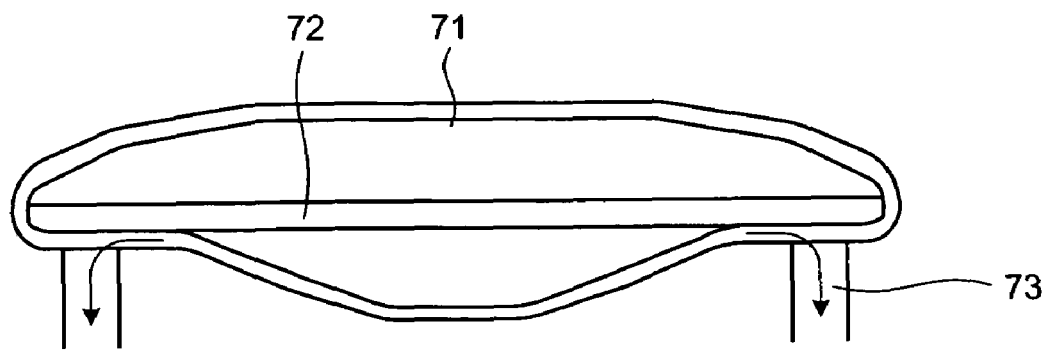
FIG. 21 is a schematic diagram of a modification of the substrate shown in FIG. 19.

FIG. 21 is a schematic diagram of a modification of the substrate shown in FIG. 19. In this modification, an entire substrate 72 at an upper stage is covered by a sheet-like magnetism-resistant section 71. In this case, measures against noise for the substrate 72 at the upper stage are further reinforced. Even in this case, the sheet-like magnetism-resistant section 71 is in contact with columns 73 in portions where an electrically conductive/thermally conductive material is exposed. Thus, it is possible to efficiently permit heat emitted from devices mounted on the substrate and heat around the sheet-like magnetism-resistant section 71 to escape to the columns 73. Since holes are opened in portions of the sheet-like magnetism-resistant section 71 in contact with the columns 73, the electrically conductive/thermally conductive material is inevitably exposed. The sheet-like magnetism-resistant section 71 may be provided in contact with the columns 73 with the electrically conductive/thermally conductive material exposed by partially peeling off a rear side or both a front side and the rear side thereof intentionally. To make it possible to check the devices on the substrate 72 from the outside, the electrically conductive/thermally conductive material may be removed in a part of the seat-like magnetism-resistant section 71 up to a size not spoiling the action of protecting the substrate from noise.

Figure 22:
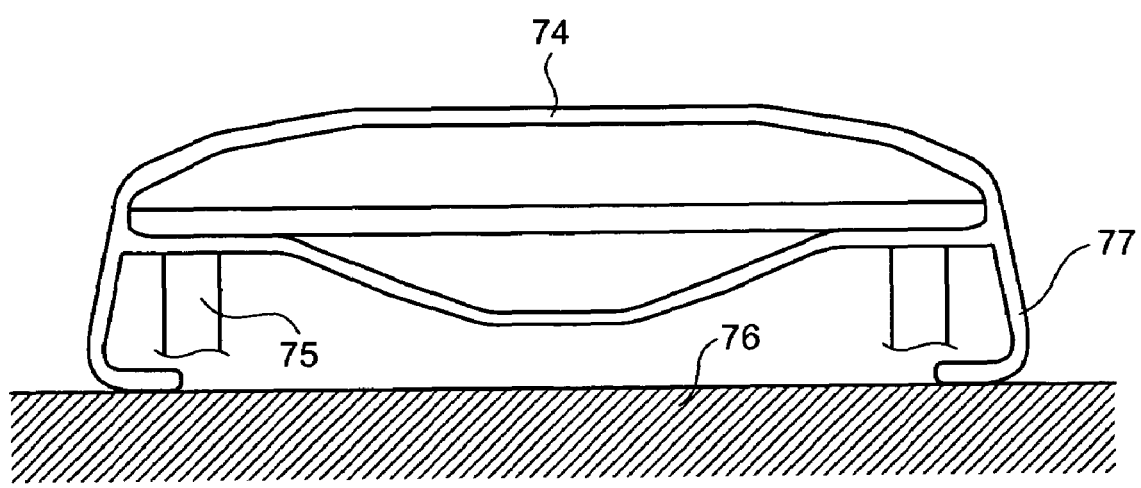
FIG. 22 is a schematic diagram of a modification of the substrate shown in FIG. 21.

FIG. 22 is a schematic diagram of a modification of the substrate shown in FIG. 21. In the modification, portions where an electrically conductive/thermally conductive material of a sheet-like magnetism resistant unit 74 is exposed are in contact with both columns 75 and a housing 76. Alternatively, a highly thermally conductive insulating material is in contact with both the columns 75 and the housing 76. Since it is possible to freely design a size and a shape of the sheet-like magnetism-resistant section 74, it is possible to provide the sheet-like magnetism-resistant section 74 in contact with the columns 75. In addition, it is possible to provide extended portions 77, where the electrically conductive/thermally conductive material is exposed, or a portion of the highly thermally conductive insulating material in direct contact with the housing 76. Consequently, it is possible to permit heat to escape to the columns 75 and the housing 76. Thus, cooling performance is improved.

It is possible to use the present invention in the control device for the vehicle-mounted electric compressor in general in which high temperature and noise tend to cause problems. Consequently, the control device is protected from noise and high temperature and a control function of the control device, for example, a function based on the shot pulse control and the high-tension side pressure of the compressor is smoothly performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for an electric compressor in which a control device that controls a motor provided in the electric compressor is mounted integrally with a housing of the electric compressor, the control device comprising a magnetism-resistant section formed in a sheet shape by sandwiching a conductive layer having an electric conductivity and a thermal conductivity, with insulating layers, and configured to cover a portion of a substrate of the control device, wherein the magnetism-resistant section includes a portion at which the conductive layer is exposed, and is arranged such that the portion is in contact with any one of the housing and a part conducting heat to the housing.

2. The control device according to claim 1, wherein the conductive layer is formed with a metal foil and the insulating layers are formed with synthetic resin.

3. The control device according to claim 1, wherein the conductive layer is formed with a metal foil and the insulating layer is formed with a insulating material having high thermal conductivity, and the magnetism-resistant section is arranged such that the insulating layer is in contact with any one of the housing and the part conducting heat.

4. The control device according to claim 1, wherein the substrate includes a plurality of substrates, and the part conducting heat is a metallic column for arranging the substrates in a relative vertical direction.

5. The control device according to claim 4, wherein the magnetism-resistant section is arranged such that at least one of the conductive layer and the insulating layer is in contact with both the metallic column and the housing.

* * * * *